United States Patent
Shen et al.

(10) Patent No.: US 10,671,620 B2
(45) Date of Patent: Jun. 2, 2020

(54) METHOD FOR RECOMMENDING A TEACHER IN A NETWORK TEACHING SYSTEM

(71) Applicant: Beijing Dami Technology Co., Ltd., Beijing (CN)

(72) Inventors: Liang Shen, Beijing (CN); Yiding Liu, Beijing (CN); Dewei Leng, Beijing (CN); Baofu Zhang, Beijing (CN)

(*) Notice: Subject to any disclaimer, the term of this patent is extended or adjusted under 35 U.S.C. 154(b) by 243 days.

(21) Appl. No.: 15/857,657

(22) Filed: Dec. 29, 2017

(65) Prior Publication Data
US 2019/0138614 A1    May 9, 2019

(30) Foreign Application Priority Data
Nov. 7, 2017  (CN) .......................... 2017 1 1082432

(51) Int. Cl.
| | |
|---|---|
| *G06F 16/2457* | (2019.01) |
| *G09B 5/00* | (2006.01) |
| *G06N 7/00* | (2006.01) |
| *G06Q 10/06* | (2012.01) |

(52) U.S. Cl.
CPC ....... *G06F 16/24578* (2019.01); *G06N 7/005* (2013.01); *G06Q 10/063112* (2013.01); *G09B 5/00* (2013.01)

(58) Field of Classification Search
CPC ........... G06F 17/3053; G06F 16/24578; G06F 17/30; G09B 5/00; G06N 7/00; G06N 7/005; G06Q 10/063112
See application file for complete search history.

(56) References Cited

U.S. PATENT DOCUMENTS

| | | | | |
|---|---|---|---|---|
| 2008/0050715 A1* | 2/2008 | Golczewski | ..... | G06Q 10/06311 434/350 |
| 2010/0076775 A1* | 3/2010 | Tesler | ..... | G06Q 30/02 705/319 |
| 2016/0098649 A1* | 4/2016 | Ifrach | ..... | G06F 17/18 705/5 |
| 2016/0267615 A1* | 9/2016 | Mital | ..... | G06Q 50/205 |
| 2017/0061528 A1* | 3/2017 | Arora | ..... | G06F 16/24578 |
| 2017/0193450 A1* | 7/2017 | Potratz | ..... | G06Q 10/1053 |
| 2017/0308866 A1* | 10/2017 | Dotan-Cohen | ..... | H04L 43/0876 |
| 2019/0102802 A1* | 4/2019 | Tuschman | ..... | G06Q 30/0251 |

FOREIGN PATENT DOCUMENTS

CN           106778894 A  *   5/2017

* cited by examiner

*Primary Examiner* — Hosain T Alam
*Assistant Examiner* — Chongsuh Park
(74) *Attorney, Agent, or Firm* — Jun He Law Offices P.C.; Zhaohui Wang

(57) ABSTRACT

The present application provides a method for recommending a teacher to a target student in a network teaching system. The method comprises: obtaining characteristic information of the target student; retrieving at least one candidate teacher from a teacher database according to the characteristic information of the target student, so as to obtain a candidate teacher list including the at least one candidate teacher; calculating, for the target student, a probability of reserving a course provided by each candidate teacher in the candidate teacher list; and ranking the at least one candidate teacher in the candidate teacher list based on the calculated probability and providing the target student with the ranked candidate teacher list.

13 Claims, 1 Drawing Sheet

METHOD FOR RECOMMENDING A TEACHER IN A NETWORK TEACHING SYSTEM

CROSS-REFERENCE TO RELATED APPLICATION

The present application claims priority to Chinese patent application No. 201711082432.1 filed on Nov. 7, 2017, the content of which is incorporated hereinto with its entirety by reference.

TECHNICAL FIELD

The present disclosure relates to a method for recommending a teacher, and particularly to a method for recommending a teacher to a target student in a network teaching system.

BACKGROUND

With the rapid development of computer network technology and the increasing demand for online education, some online teaching systems have emerged in the market to provide users with, for example, online course or training and English teaching.

For a network teaching system in which a student can choose a teacher independently, the student generally screens and selects desired teachers by inputting keywords. With increase of the number of teachers in a teacher database, the number of teachers in the screened results for a student will also increase. As a result, the student is required to browse a large amount of teacher information before finally determining which teacher to choose. On the other hand, although the student can reduce the number of screened results by using a set of keywords, increasing the number of keywords will inevitably exclude some teachers with certain relevance, which reduces the accuracy of the screened results.

Therefore, how to quickly find a suitable teacher from a large number of teachers is an urgent problem to be solved.

SUMMARY

Addressing the above mentioned problems, the present application provides a method and device for recommending a teacher to a target student in a network teaching system.

In one aspect of the present application, a method for recommending a teacher to a target student in a network teaching system is provided. The method comprises: obtaining characteristic information of the target student; retrieving at least one candidate teacher from a teacher database according to the characteristic information of the target student, so as to obtain a candidate teacher list including the at least one candidate teacher; calculating, for the target student, a probability of reserving a course provided by each candidate teacher in the candidate teacher list; and ranking the at least one candidate teacher in the candidate teacher list based on the calculated probability and providing the target student with the ranked candidate teacher list.

In can be seen that, for the method of recommending teachers in the present application, candidate teachers can be recommended based on the characteristic information of the target student, thereby facilitating the target student to decide whether or not to reserve a course provided by the recommended candidate teachers, which can effectively improve the success rate of course-reservation, and reduce the processing cost of the network teaching system.

In another aspect of the present application, a device for recommending a teacher to a target student in a network teaching system is provided. The device comprises a processor and a memory configured to store instructions executable by the processor. The processor is configured to: obtain characteristic information of the target student; retrieve at least one candidate teacher from a teacher database according to the characteristic information of the target student, so as to obtain a candidate teacher list including the at least one candidate teacher; calculate, for the target student, a probability of reserving a course provided by each candidate teacher in the candidate teacher list; and rank the at least one candidate teacher in the candidate teacher list based on the calculated probability, and provide the target student with the ranked candidate teacher list.

In yet another aspect of the present application, a computer-readable medium comprising program instructions executable by a computer to perform a process for recommending a teacher to a target student in a network teaching system is provided. The process comprising: obtaining characteristic information of the target student; retrieving at least one candidate teacher from a teacher database according to the characteristic information of the target student, so as to obtain a candidate teacher list including the at least one candidate teacher; calculating, for the target student, a probability of reserving a course provided by each candidate teacher in the candidate teacher list; and ranking the at least one candidate teacher in the candidate teacher list based on the calculated probability and providing the target student with the ranked candidate teacher list.

The foregoing is a summary of the present application and may be simplified or summarized, or some details of the application may be omitted. Thus, those skilled in the art will recognize that this section is merely illustrative and is not intended to limit the scope of the application in any way. This summary is neither intended to identify key features or essential features of the claimed subject matter, nor intended to be used as a supplementary means in determining the scope of the claimed subject matter

BRIEF DESCRIPTION OF THE DRAWINGS

The above and other features of the present disclosure will be more fully understood from the following description and the appended claims, taken in conjunction with the accompanying drawings. It is understood that these drawings depict only several embodiments of the disclosure and therefore should not be considered to limit the scope of the disclosure. The present application will be more clearly and specifically described with reference to the accompanying drawings.

DETAILED DESCRIPTION

In the following detailed description, reference is made to the accompanying drawings that constitute a part of the description. In the accompanying drawings, similar numerals generally represent similar components, unless otherwise indicated in the context. The illustrative embodiments described in the detailed description, drawings, and claims are not meant to be limiting. Other embodiments may be utilized, and other changes may be made without departing from the spirit or scope of the subject matter of the present application. It is to be understood that many different configurations of arrangements, alternatives, combinations, and designs may be made based on various aspects of the present disclosure that generally described herein and illustrated in the accompanying drawings, and all of them are explicitly contemplated and form a part of this application.

Figure 1:
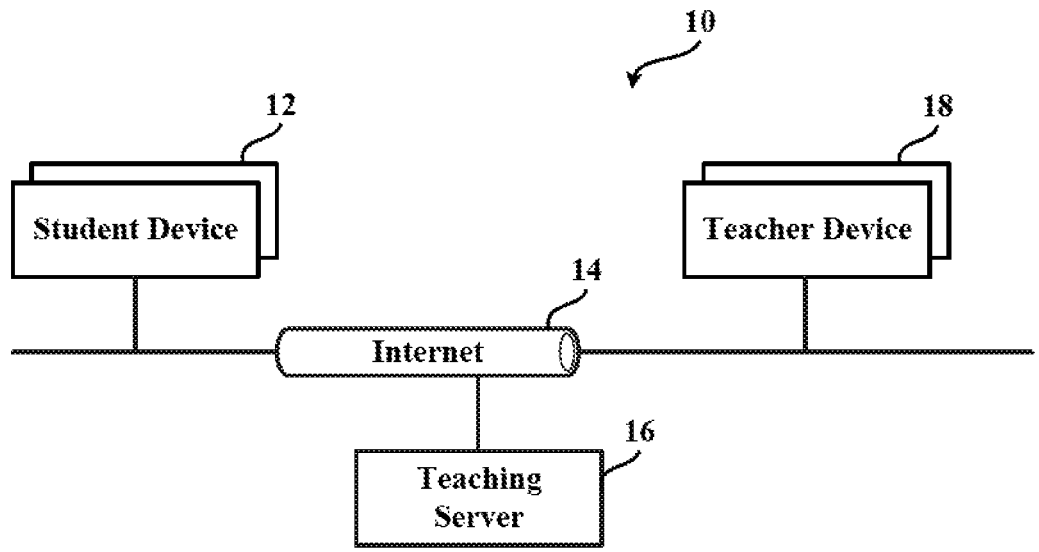
FIG. 1 illustrates a network teaching system according to one embodiment of the present application.

FIG. 1 illustrates a network teaching system 10 according to one embodiment of the present invention.

In some embodiments, the network teaching system 10 may include a student device 12, which may be a desktop computer, a notebook computer, or other computing devices. The student device may be connected to the Internet 14 via a wired or wireless network. In other embodiments, the student device 12 may also be a smart mobile communication terminal, such as a mobile communication terminal using the Android or Apple IOS operating system, which may be connected to the Internet 14 over a wireless network, such as WiFi or mobile data communication network.

In some embodiments, the network teaching system 10 may further include a teacher device 18. Similarly, the teacher device 18 may also be a desktop computer, a notebook computer, or other computing devices. The teacher device 18 may be connected to the Internet 14 over a wired or wireless network. In other embodiments, the teacher device 18 may also be a smart mobile communication terminal, such as mobile communication terminal using the Android or Apple IOS operating system, which may be connected to the Internet 14 over a wireless network, such as WiFi or mobile data communications network.

In some embodiments, the network teaching system 10 further includes a teaching server 16. The teaching server 16 is connected to the Internet 14 in a wired or wireless manner. In some embodiments, the teaching server 16 may be a commonly used computer device capable of managing resources and providing services to users, and may include a processor, a memory, and any other components in a general purpose computer architecture. In the network teaching system 10, both the student device 12 and the teacher device 18 can access the teaching server 16 via the Internet 14, so that the teaching server 16 can provide the student device 12 and the teacher device 16 with services like information processing, data storage and management, etc.

In some embodiments, the network teaching system 10 may be used to provide teaching services between students and teachers. In some embodiments, a student using the network teaching system 10 can select a desired teacher among all the teachers provided by the teaching server 16 using the student device 12, so as to receive teaching service provided by the teacher. After determining the desired teacher, the student can initiate a request for course reservation to the teacher. After the teacher accepts the reservation request from the student, the network teaching system 10 may arrange teaching service between the student and the teacher at a specific period of time. In some embodiments, the student and teacher can communicate in real time by means of video based on the video calling function of the student device 12 and the teacher device 18. In one embodiment, the student can find his or her desired teacher through the screening function provided by the teaching server 16. In another embodiment, the teaching server 16 is capable of proactively recommending teachers whom the student may be interested in.

Figure 2:
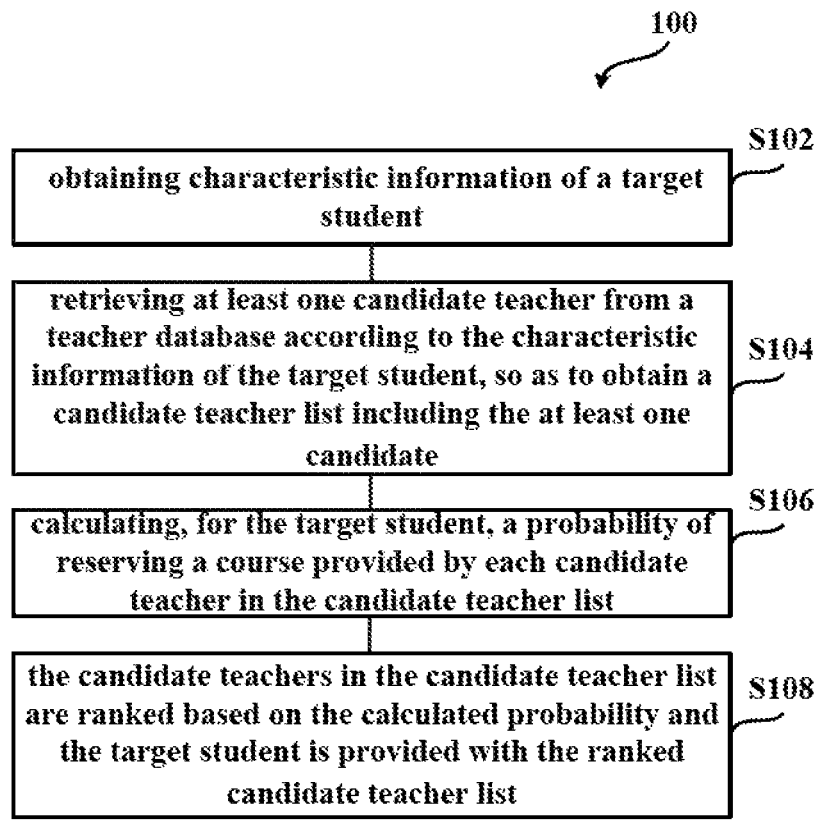
FIG. 2 illustrates a method for recommending a teacher to a target student in a network teaching system according to one embodiment of the present application.

FIG. 2 illustrates a method 100 for recommending a teacher to a target student in a network teaching system according to one embodiment of the present invention. At least a portion of the method 100 may be performed by the teaching server 16 in, for instance, the network teaching system 10 as illustrated in FIG. 1. In combination with FIG. 1, the method 100 shown in FIG. 2 includes the following steps.

In step S102, characteristic information of a target student is obtained. In some embodiments, the characteristic information of the target student includes personal parameters of the target student and/or operating action records of the target student with regard to a teacher.

In some embodiments, a student may enter or otherwise provide some personal parameters after registering as a user of the network teaching system. For example, the student can choose his or her own age, region, learning level, purchasing power, personality, gender, and interest points as his or her own personal parameters. Different personal parameters indicate the characteristics of the student in a certain aspect, which helps the network teaching system to identify the characteristics of different students. For example, a 5 years old student and an 8 years old student may differ in language skills and understanding abilities. Therefore, the network teaching system can provide different services for different age groups or provide different recommended information. For another example, a female student and a male student may have different interests and ways of thinking. Therefore, the network teaching system may also provide different services or provide different recommended information according to different genders.

It is understood that each student may have multiple types of personal parameters, and combinations of different types of personal parameters may also be used to indicate the characteristics of a student. For example, services provided for a 5 years old female student may differ from services provided for an 8 years old male student.

In some embodiments, the network teaching system 10 may include a student database, which is integrated, for example, in the teaching server 16, or can be accessed by the teaching server 16. The student database includes personal parameters corresponding to students registered users of the network teaching system.

It should be noted that the personal parameters may be standardized data provided by students themselves or standardized data provided by guardians of the students (for example, by selecting a suitable personal parameter from a plurality of candidate personal parameters). In some embodiments, a student may also provide some personal descriptions or introductions, and the network teaching system may provide a parameter extraction program or algorithm to extract corresponding personal parameters from the personal descriptions or introductions. For example, a student may describe in his personal description that: I am from Shanghai and I am 6 years old. Then, the network teaching system can obtain the following personal parameters using the specific program or algorithm: Region—Shanghai, Age—6.

In addition to the personal parameters or related information provided by the student as mentioned above, the student may have some operating action records with regard to a teacher in the process of using the network teaching system. In some embodiments, the operating action records with regard to a teacher may include browsing action record, course-reserving action record, and/or following action record. For example, the browsing action record of the student includes the number of browsing a teacher by the student; the course-reserving action record includes the number of reserving a course from a teacher by the student; and the following action record includes whether a teacher is being followed by the student.

Specifically, a student can log in the network teaching system, and then search and browse personal pages of some teachers to learn their basic information. For example, a personal page of a teacher may include head portrait photo, personality, region, age, educational background, teaching experience, specialty, teaching time, student evaluation, the number of followers and the like of the teacher. In some embodiments, the network teaching system records each browsing action of a specific student with regard to personal page of a specific teacher, so as to generate a browsing action record of the student. For example, the network teaching system can record that Student A browsed the personal page of Teacher A for 10 times, and the personal page of Teacher B for 5 times, and so on. Since students may have different interest points and learning objectives at different stages of learning, in some embodiments, the browsing action record of students may be periodical, such as browsing action records for the latest week, the latest month, the latest three months, or the latest one year. It can be understood that since a student may browse the same teacher repeatedly at different times, the browsing action record may further include the number of browsing and/or the specific time of each browsing.

In an actual course reservation, after determining a suitable teacher, a student will initiate reserving a course provided by the teacher through the stem and receive the teaching service from the teacher at a predetermined time. In some embodiments, the network teaching system records each course-reserving action of a specific student with regard to a specific teacher. For example, the network teaching system can record that Student A reserved a course provided by Teacher A for 10 times, and reserved a course provided by Teacher B for 5 times, and so on. It will be appreciated that in some circumstances, for example, for various reasons such as accidents, incidents, personal reasons, etc., a student may not be able to take the course at the reserved time after the reservation. Therefore, in some embodiments, the course-reserving record may not include the course reservation after which the course is not taken timely. In other embodiments, the course-reserving action record may include the course reservation after which the course is completed timely, or is not completed timely. In addition, similar to the browsing action record, course-reserving action record may be a periodic or non-periodic action record. It can be understood that since a student may take a course provided by the same teacher repeatedly at different times, the course-reserving action record may further include the number of course-reservation and/or the specific time of each course-reservation.

In some embodiments, after the personal page of a teacher is browsed, the student may first the browsed teacher if he/she feels that the teacher is suitable. For example, a "follow" button may be provided on the personal page of a teacher, and a student can add the teacher to his or leek following list by clicking on the "follow" button. In some embodiments, the network teaching system records whether a particular student is following a particular teacher or not. For example, the network teaching system can record that Student A follows Teacher A, Teacher B, Teacher C, and so on.

It can be understood that the operating action records of a student with regard to a teacher may reflect the interest of the student regarding a course provided by the teacher, and thus can be used for subsequent teacher recommendation. In some embodiments, subsequent processing may be performed based on operating action records from one type of operating action. In other embodiments, subsequent processing may also be performed based on combined records from multiple types of operating actions. In addition, optionally, for different types of operating action records, corresponding priorities or weights may also be set. For example, compared with the browsing action and following action, the course-reserving action means that a student has actually accepted or plans to accept a teacher's course, and thus can be set with a higher weight. Moreover, compared with the following action, the browsing action only represents that a student is still in the process of selecting teachers, and whether the student is satisfied with the browsed teachers is not sure. As a result, the browsing action can be set with a lower weight.

In addition, it should be noted that, operating actions of a student with regard to each teacher may also be recorded for the teacher correspondingly. For example, a teacher may have a corresponding following record that includes a list of students who follow the teacher. For another example, a teacher may also have a corresponding course-giving record that includes a list of students who have reserved a course with the teacher.

Next, in step S104, retrieving at least one candidate teacher from a teacher database according to the characteristic information of the target student, so as to obtain a candidate teacher list including the at least one candidate teacher. In some embodiments, the network teaching system includes a teacher database that includes all the teachers that a student can choose as well as personal parameters of each teacher.

In some embodiments, the characteristic information of the target student includes personal parameters of the target student and/or operating action records of the target student with regard to a teacher. In some embodiments, the operating action records with regard to a teacher include a browsing action record, a course-reserving action record and a following action record.

In one embodiment, the candidate teachers may be retrieved from the teacher database according to the personal parameters of the target student, so as to obtain a candidate teacher list TList1 including at least one candidate teacher. For example, the network teaching system may include a student database, which records personal parameters for all students, such as age, region, learning level, purchasing power, personality, gender, and interest points. In one embodiment, when a student is 6 years old, the network teaching system can obtain a list of teachers clicked by all students of 6 years old. For another example, when a student is a 6 years old girl in Shanghai, the network teaching system obtains teachers clicked by all the students in the region Shanghai, teachers clicked by all the students of 6 years old, and teachers clicked by all the female students respectively, and then use a linear weighted method to get a list of teachers clicked by a 6 years old girl in Shanghai. In another embodiment, the teacher list may also be obtained based on parameters that are substantially the same as the personal parameters of the target student. For example, a list of teachers clicked by all 6 years old girls in Shanghai can be obtained. In some other embodiments, a teacher list may be obtained first according to the situation where a plurality of parameters are the same (for example, a parameters, which depends on the number M of the personal parameters of the target student, n is not greater than M). When there are few candidate teachers included in the teacher list obtained by the situation where a plurality of parameters are the same, the teacher list may be obtained again with fewer parameters (e.g., n−1, n−2 . . . down to 1) until the number of candidate teachers meets the requirement for a predetermined number. This approach can not only improve the relevance of candidate teachers, but also avoid the situation where the requirements for parameters are too strict to get enough candidate teachers. It is understood that when a student has different types and different numbers of personal parameters, the candidate teacher list TList1 including at least one candidate teacher can be obtained by a similar method. It should be noted that, the same personal parameters mentioned in the present application include the situation where the personal parameters are substantially the same, as described above. In some embodiments, being the same or substantially the same to the personal parameters of the target student may include the situation where at least one of the personal parameters is the same. In other embodiments, being the same or substantially the same to the personal parameters of the target student may include the situation where at least two, three or more personal parameters are the same. In some embodiments, different priorities can be set for different personal parameters, and the personal parameters with lower priorities may be disregarded, especially when the number of candidate teachers matching the high-priority parameters is small. For example, parameters such as age, gender, etc., can be set with a relatively higher priority, while region, etc., can be set with a relatively lower priority.

In some embodiments, candidate teachers may be retrieved from the teacher database according to a browsing action record of the target student, so as to obtain a candidate teacher list TList2 including at least one candidate teacher. As mentioned above, the browsing action record includes the number of browsing the related personal page of a teacher. Accordingly, the network teaching system records all the browsing action records of all students. For Student Si, the browsing action vectors generated for n teachers can be {Ti1, Ti2 . . . Tij . . . Tin}, where Tij represents the number of browsing actions that Student Si generated for Teacher Tj. In some embodiments, a MetaPath method may be used to calculate a similarity of the browsing action between Student Si and Teacher Tj, and the similarity may be located as Simi1 (Si, Tj). The MetaPath method is used in a Heterogeneous Information Network (HIN) to represent sequences of node classes and edge types between two nodes in the HIN. The MetaPath method can be used for information extraction, decision making and other application areas. For more information on the MetaPath method, see *Discovering Meta-Paths in Large Heterogeneous Information Networks*, Changping Meng et al., World Wide Web Conference 2015, May 18-22, 2015, Florence, Italy, the entire content of which is incorporated herein by reference.

In addition to the browsing action record of the target student, in some embodiments, the similarity of the browsing action between the target Student Si and a teacher may also be determined based on the browsing action records of other students associated with the target Student Si. For example, browsing action records, course-reserving action records and following action records of Student Sk who recommended the network teaching system to Student Si can be used to determine the similarity of the browsing action between the student Si and a teacher. Further, the candidate teacher list TList2 including at least one candidate teacher is obtained by comparing the similarity. For example, the MetaPath method can be used to generate n similarities, i.e. Simi1 (S1, T1), Simi1 (S1, T2), . . . , Simi1 (S1, Tn), with n teachers, and the candidate teachers recommended to the target Student Si can be determined by comparing the n similarities.

In some embodiments, candidate teachers may also be retrieved from the teacher database according to the course-reserving action record and following action record of the target student, so as to obtain candidate teacher lists TList3 and TList4 including at least one candidate teacher, respectively. The method for obtaining TList3 and TList4 is similar to the method for obtaining TList2, so no further description is given here.

In some embodiments, any one of TList1, TList2, TList3, and TList4 may be used independently as the candidate teacher list in step S104. In other embodiments, a set of TList1, TList2, TList3, and TList4 may be used as the candidate teacher list to step S104. In other embodiments, a set consists of any two or three of TList1, TList2, TList3, and TList4 may also be used as the candidate teacher list in step S104. As mentioned above, in some embodiments, in the situation where a set consists of multiple lists is employed, elements in different lists may be set or assigned with different weights of priorities.

Further, in step S106, calculating, for the target student, a probability of reserving a course provided by each candidate teacher in the candidate teacher list.

In some embodiments, a logistic regression method commonly used in the field of machine learning may be used to predict for the target student the probability of reserving a course from the candidate teachers. It is to be understood the features used for constructing a logistic regression model may include student features, teacher features, and/or student-teacher correlation features in some embodiments, the student features include at least one item selected from a group consisting of age, region, learning level, purchasing power, personality, gender, and interest points. For example, if a student, David, is 9 years old and male, lives in Dongcheng District, Beijing, and is well-to-do (which means high purchasing power), the feature of such a student can be represented by a set of key_value such as [student_age: 9, student_gender: male, student_area: Beijing, student_purchase: high]. The teacher features include at least one item selected from a group consisting of age, region, teaching seniority, graduation school, the number of reviews, rating, browsing crowd, days of induction, and the number of followers. For example, if a teacher, Grace, is 30 years old and female, living in Los Angeles, the U.S.A., graduated from California State University, having a teaching experience of 8 years, having an average score of 4.99 (out of 5) set by students, the feature of such a teacher can be represented by a set of key_value such as [teacher_age: 30, teacher_gender: female, teacher_area: Los Angeles, teacher_experience: 8, teacher_rating: 4.99]. The student-teacher correlation features include at least one item selected from a group consisting of student browsing, student course-reservation, student following, student evaluation, and teacher evaluation. For example, for the student David mentioned above, teacher Grace may be one of his candidate teachers, and 80% of David's course-reservation are from the courses provided by Grace. Thus, the student course-reservation (reflecting the favor of the student for the teacher) of the student-teacher correlation feature may be set to 0.8. Moreover, it will be understood that the student features, teacher features, and/or student-teacher correlation features may include features other than those listed above.

For example, the age, gender, region, and purchasing power of the student features, the age, gender, region, teaching seniority, and rating of the teacher features, and the student course-reservation of the student-teacher correlation features can be selected, and the above ten features can be used to construct a logistic regression model to calculate for the target student the probability of reserving a course provided by each candidate teacher in the candidate teacher list. For a student-teacher pair consisting of student David and teacher Grace as mentioned above, the student-teacher pair can be represented as [student_age: 9, student_gender: male, student_area: Beijing, student_purchase: high, teacher_age: 30, teacher_gender: female, teacher_area: Los Angeles, teacher_experience: 8, teacher_rating: 4.99, student_teacher_favour: 0.8]. Then, by the processing of continuous feature discretization and independent hot coding, a high dimensional sparse vector such as [student_age_9:1, student_gender_male:1, student_area_Beijing:1, student_purchase_high:1, teacher_age_30:1, teacher_gender_female:1, teacher_area_Los Angeles:1, teacher_experience_8:1, teacher_rating_(4-5):1, student_teacher_favour_(0.7,0.8]:1] can be obtained. The same method can be applied to other student-teacher pairs to get a large amount of sample data, which can then be used to construct a logistic regression model.

In some embodiments, a logistic regression model may be constructed by using a crossed feature between student features, teacher features and/or teacher-student correlation features. It is to be understood that any of the student features, teacher features and/or teacher-student correlation features can be selected as a crossed feature. For example, student age and teacher age can be selected for crossing, or learning level of a student and teaching seniority of a teacher can be selected for crossing. The crossing of features allows different features to interact with each other, thereby introducing nonlinearities.

In some embodiments, a plurality of logistic regression models may be constructed, using different crossed features to respectively predict for a target student the probability of reserving a course provided by the candidate teachers. In a preferred embodiment, each logistic regression model can be evaluated using the Area Under Curve (AUC) algorithm and the logistic regression model with the highest evaluation score can be used to predict the probability of course-reservation. For example, the learning level of the student features and the teaching seniority of the teacher features can be selected as a crossed feature, or the student gender of the student features and the teacher gender of the teacher features can be selected as a crossed feature, or the learning level of the student features and the teacher age of the teacher features can be selected as a crossed feature, so that three types of sample data can be generated to construct three different logistic regression models. The three logistic regression models use three different crossed features respectively, and then are used respectively to calculate for the target student the probability of reserving a course provided by each candidate student in the candidate student list. Finally, the three logistic regression models can be evaluated using the AUC, and the probability calculated by the logistic regression model with the highest evaluation score can be used in the subsequent step.

In step S108, the candidate teachers in the candidate teacher list are ranked based on the calculated probability and the target student is provided with the ranked candidate teacher list.

In some embodiments, after ranking the candidate teachers, the top 20 teachers who have the highest probability of course-reservation are recommended to the target student. In other words, the list of ranked candidate teachers as provided to the target student includes 20 teachers. In other embodiments, the list of ranked candidate teachers as provided to the target student may include more or less than 20 teachers.

It is appreciated that the list of candidate teachers as obtained may be presented on e.g. a student device of the target student, and the target student may determine whether or not to reserve a course provided by one or more candidate teachers by reviewing introductory information for each candidate teacher. In some embodiments, the target student may reserve a course by sending an invitation of course-reservation to the candidate teacher. If the teacher who receives the invitation accepts the invitation, the course-reservation is completed. Conversely, if the teacher cannot provide the course at the time prescribed in the course-reservation because of some particular reasons, the teacher may rejected the course-reservation, or propose a new teaching time for the student to confirm. In other embodiments, while presenting the candidate teacher list to the student, the currently available teaching time for each candidate teacher within a period of time (one day, one week, two weeks, or other time periods) may also be retrieved from the system, and thus the student may choose the desired teaching time. In this way, after the student has selected the candidate teacher and the corresponding teaching time, the course-reserving procedure is completed without the confirmation of the teacher.

In some embodiments, the present application also provides a non-transitory computer-readable storage medium including instructions, such as a memory including instructions. The instructions are executable by a processor of the teaching server 16 such as shown in FIG. 1 to implement the method 100 shown in FIG. 2. For example, a non-transitory computer-readable storage medium may be a ROM, a RAM, a CD-ROM, a magnetic tape, a flash memory, a hard disk, a floppy disk, an optical data storage device, or the like.

It should be noted that although several modules or sub-modules of the network teaching system in the embodiments of the present application are mentioned in the foregoing detailed description, such division is merely exemplary and not mandatory. In fact, according to the embodiments of the present application, the features and functions of the two or more modules described above can be embodied in one module. Conversely, the features and functionality of one of the modules described above can be further divided into multiple modules.

In addition, while the operations of the method of the present application are described in a particular order in the drawings, this does not require or imply that these operations must be performed in that particular order, or that of the illustrated operations be performed in order to achieve the desired results. Instead, steps depicted in the flowchart can be executed in another order. Additionally or alternatively, certain steps may be omitted, several steps may be combined into one step, and/or one step may be divided into multiple steps.

Other variations to the disclosed embodiments can be understood and effected by one of ordinary skill in the art upon reviewing the specification and drawings, as well as the appended claims. In the claims, the word "comprising" does not exclude other elements and steps, and the expressions "a" and "an" do not exclude the plural. In the practice of the invention, a component may perform the functions of several of the technical features referenced in the claims. Any reference signs in the claims should not be construed as limiting their scope.

What is claimed is:

1. A method for recommending a teacher to a target student in a network teaching system, the method comprising:
obtaining characteristic information of the target student, wherein the characteristic information of the target student includes operating action records of the target student with regard to a teacher, wherein the operating action records of the target student with regard to a teacher include a browsing action record, a course-reserving action record and/or a following action record, and wherein the browsing action record includes a number of students browsing a teacher, the course-reserving action record includes a number of students reserving a course from a teacher, and the following action record includes whether a teacher is being followed;
retrieving at least one candidate teacher from a teacher database according to the characteristic information of the target student, so as to obtain a candidate teacher list including the at least one candidate teacher;
calculating, for the target student, a probability of reserving a course provided by each candidate teacher in the candidate teacher list; and
ranking the at least one candidate teacher in the candidate teacher list based on the calculated probability, and providing the target student with the ranked candidate teacher list.

2. The method according to claim 1, wherein the characteristic information of the target student further includes personal parameters of the target student.

3. The method according to claim 2, wherein the personal parameters of the target student include at least one item selected from a group consisting of age, region, learning level, purchasing power, personality, gender and interest points.

4. The method according to claim 2, wherein the characteristic information of the target student includes the personal parameters of the target student, and the step of retrieving at least one candidate teacher from the teacher database according to the characteristic information of the target student comprises:
obtaining, from a student database, course-reserving action records of the target student and/or course-reserving action records of other students having the same personal parameters; and
screening teachers in the teacher database based on the course-reserving action records, so as to determine the candidate teachers matched with the target student.

5. The method according to claim 1, wherein the step of retrieving at least one candidate teacher from the teacher database according to the operating action records of the target student comprises:
obtaining, from a student database, operating action records of the same type for all students, so as to calculate a similarity of operating action of each student with regard to different teachers;
screening teachers in the teacher database based on the calculated similarity of operating action, so as to determine the candidate teachers matched with the target student.

6. The method according to claim 1, wherein calculating, for the target student, the probability of reserving a course provided by each candidate teacher in the candidate teacher list comprises:
predicting, for the target student, the probability of reserving a course provided by each candidate teacher using a logistic regression method.

7. The method according to claim 6, wherein the step of predicting, for the target student, the probability of reserving a course provided by each candidate teacher using the logistic regression method comprises:
constructing a logistic regression model by using a crossed feature between student features, teacher features and/or teacher-student correlation features.

8. The method according to claim 7, wherein the student features include at least one item selected from a group consisting of age, region, learning level, purchasing power, personality, gender, and interest points.

9. The method according to claim 7, wherein the teacher features include at least one item selected from a group consisting of age, region, teaching seniority, graduation school, the number of reviews, rating, browsing crowd, days of induction, and the number of followers.

10. The method according to claim 7, wherein the student-teacher correlation features include at least one item selected from a group consisting of student browsing, student course-reservation, student following, student evaluation, and teacher evaluation.

11. The method according to claim 7, wherein the step of predicting, for the target student, the probability of reserving a course provided by each candidate teacher using the logistic regression method further comprises:
evaluating the logistic regression model using an Area Under Curve algorithm; and
predicting the probability using the logistic regression model with the highest evaluation score.

12. A device for recommending a teacher to a target student in a network teaching system, the device comprising:
a processor; and
a memory configured to store instructions executable by the processor; wherein
the processor is configured to:
obtain characteristic information of the target student, wherein the characteristic information of the target student includes operating action records of the target student with regard to a teacher, wherein the operating action records of the target student with regard to a teacher include a browsing action record, a course-reserving action record and/or a following action record, and wherein the browsing action record includes a number of students browsing a teacher, the course-reserving action record includes a number of students reserving a course from a teacher, and the following action record includes whether a teacher is being followed;
retrieve at least one candidate teacher from a teacher database according to the characteristic information of the target student, so as to obtain a candidate teacher list including the at least one candidate teacher;
calculate, for the target student, a probability of reserving a course provided by each candidate teacher in the candidate teacher list; and
rank the at least one candidate teacher in the candidate teacher list based on the calculated probability and provide the target student with the ranked candidate teacher list.

13. A non-transitory computer-readable medium comprising program instructions executable by a computer to perform a process for recommending a teacher to a target student in a network teaching system, the process comprising:
- obtaining characteristic information of the target student, wherein the characteristic information of the target student includes operating action records of the target student with regard to a teacher, wherein the operating action records of the target student with regard to a teacher include a browsing action record, a course-reserving action record and/or a following action record, and wherein the browsing action record includes a number of students browsing a teacher, the course-reserving action record includes a number of students reserving a course from a teacher, and the following action record includes whether a teacher is being followed;
- retrieving at least one candidate teacher from a teacher database according to the characteristic information of the target student, so as to obtain a candidate teacher list including the at least one candidate teacher;
- calculating, for the target student, a probability of reserving a course provided by each candidate teacher in the candidate teacher list; and
- ranking the at least one candidate teacher in the candidate teacher list based on the calculated probability, and providing the target student with the ranked candidate teacher list.

* * * * *